H. Gransden,

Mangle.

N° 67,293. Patented July 30, 1867.

Witnesses.

Inventor.

United States Patent Office.

HENRY GRANSDEN, OF DUBUQUE, IOWA.

Letters Patent No. 67,293, dated July 30, 1867.

---

IMPROVED MANGLE.

---

*The Schedule referred to in these Letters Patent and making part of the same.*

---

TO ALL WHOM IT MAY CONCERN:

Be it known that I, HENRY GRANSDEN of Dubuque, in the county of Dubuque, and State of Iowa, have invented a new and useful improvement in Mangles; and I do hereby declare that the following is a full, clear, and exact description thereof, which will enable those skilled in the art to make and use the same, reference being had to the accompanying drawings, forming part of this specification.

The object of my invention is to furnish a simple, cheap, and durable machine (called a mangle) for smoothing linen, thereby obviating the necessity of going through with the old tedious and laborious process of "ironing;" and the invention consists in placing in a suitable frame rollers, between which the linen is made to pass under pressure and in the manner hereinafter described.

Similar letters of reference indicate corresponding parts.

Figure 1:
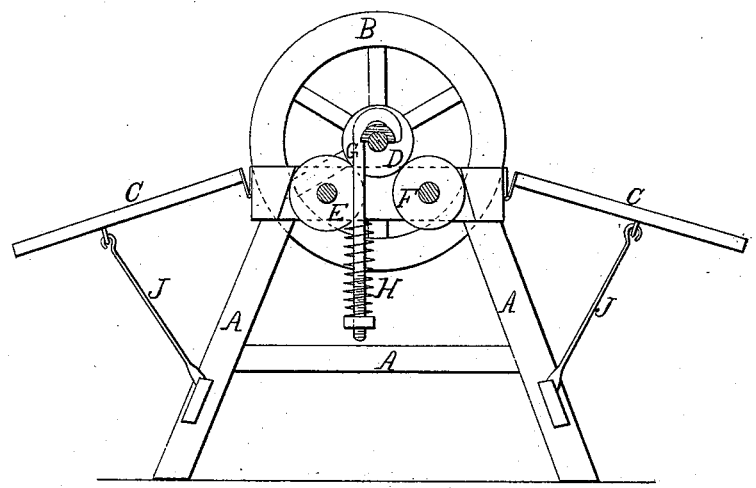
Figure 1 represents an end elevation of the mangle, showing the form of the frame and the manner in which the pressure upon the upper roller is obtained.
Figure 2:
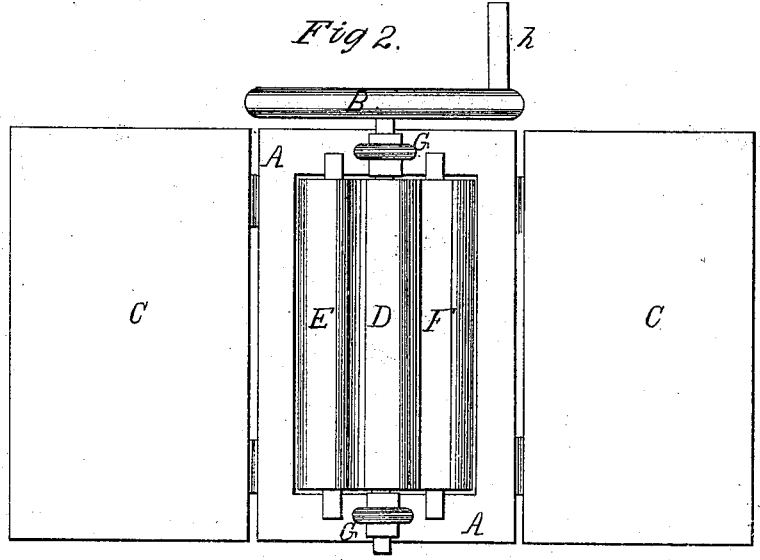
Figure 2 is a plan or top view, showing the rollers in place.

A represents the frame. B is the fly-wheel, to which the crank or handle is attached. C represents the aprons, which are attached to the frame by hinges, as seen in fig. 1. D is the upper roller, and E F represent the other two rollers. G represent the hooks, which hold down the roller D by the aid of the spring H. J represent braces, which support the aprons, as seen in fig. 1.

The two rollers E and F are placed in the frame parallel to each other, and are stationary in the positions represented. Each roller has pivots or bearings at its ends, upon which it is revolved. The roller D has strong bearings or journals at each end. The fly-wheel is attached to one end and the hooks G are attached to each end or partially surround a box placed on the top of the pivot or journal, as seen in yellow in fig. 1. These hooks have long shanks, which pass down through the frame, and each has a spiral spring on its lower part. These springs H bear against the under side of the frame at their upper ends, and against screw-nuts on the shank of the hooks, at their lower ends.

The operation will at once be understood. As the upper roller is raised by linen being run through between the rollers, the tension of the springs draws it down with a force which increases as the roller is raised. The rollers all lie parallel with each other, and have straight and smooth surfaces. They are all revolved by turning the crank or handle marked $h$.

The aprons C are for the purpose of supporting the linen while it is being fed in between the rollers on one side and receiving it on the other side. When not in use the aprons may be dropped down out of the way.

What I claim, and desire to secure by Letters Patent, is—

The rollers D E F, the hook G, the springs H, the aprons C, the fly-wheel B, and the braces J, arranged substantially as herein shown and described, in combination with the frame A, for the purposes set forth.

HENRY GRANSDEN.

Witnesses:
J. R. BECK,
D. H. KENNEDY.